(12) United States Patent
Selman

(10) Patent No.: US 7,040,573 B2
(45) Date of Patent: May 9, 2006

(54) LANDPLANE TO FLYING BOAT CONVERSION

(76) Inventor: Richard Selman, 884 Lower Page Rd., Smelterville, ID (US) 83868

(\*) Notice: Subject to any disclaimer, the term of this patent is extended or adjusted under 35 U.S.C. 154(b) by 63 days.

(21) Appl. No.: 10/859,943

(22) Filed: Jun. 4, 2004

(65) Prior Publication Data

US 2006/0016933 A1    Jan. 26, 2006

Related U.S. Application Data

(60) Provisional application No. 60/540,974, filed on Feb. 2, 2004.

(51) Int. Cl.
*B64C 25/54* (2006.01)
(52) U.S. Cl. ........................... 244/101; 244/106
(58) Field of Classification Search ............... 244/101, 244/105, 106, 108, 125, 2, 121; 114/62
See application file for complete search history.

(56) References Cited

U.S. PATENT DOCUMENTS

| | | | | |
|---|---|---|---|---|
| 1,329,336 A | * | 1/1920 | Curtiss | 244/106 |
| 1,537,973 A | * | 5/1925 | Uppercu | |
| 1,728,621 A | * | 9/1929 | Martin | 244/105 |
| 1,778,467 A | * | 10/1930 | Pettersen | 244/106 |
| 2,110,865 A | * | 3/1938 | Burgess | 244/101 |
| 2,123,665 A | * | 7/1938 | Sikorsky | |
| 2,218,938 A | * | 10/1940 | Rinne | |
| 3,082,975 A | * | 3/1963 | Cardwell et al. | 244/2 |
| 3,190,587 A | * | 6/1965 | Fries | 244/106 |
| 3,945,589 A | | 3/1976 | Crompton | |
| 4,799,630 A | | 1/1989 | Richards | |
| 4,892,055 A | * | 1/1990 | Schad | |
| 5,427,048 A | * | 6/1995 | Takeuchi | 114/62 |
| 5,542,626 A | * | 8/1996 | Beuck et al. | 244/105 |
| 5,653,189 A | | 8/1997 | Payne | |
| 5,823,468 A | * | 10/1998 | Bothe | 244/2 |
| 5,913,493 A | * | 6/1999 | Labouchere | 244/105 |
| 6,113,028 A | | 9/2000 | Lohse | |
| 6,290,174 B1 | | 9/2001 | Giola | |
| 6,367,737 B1 | | 4/2002 | Lohse | |
| 6,592,073 B1 | | 7/2003 | Meekins | |
| 6,705,905 B1 | | 3/2004 | Tanaka | |
| 2002/0011199 A1 | | 1/2002 | Barsumian | |
| 2002/0144639 A1 | * | 10/2002 | Scarcella | |

OTHER PUBLICATIONS

The Spokesman-Review, May 11, 2004, Spokane, WA.

\* cited by examiner

*Primary Examiner*—Peter M. Poon
*Assistant Examiner*—T. D. Collins
(74) *Attorney, Agent, or Firm*—Scott J. Fields; Jon Muskin; National IP Rights Center

(57) ABSTRACT

An aerodynamically efficient fiberglass hull consisting of a pointed bow, a step amidships, and aft section coming to a point which will be attached to the hull of land aircraft and convert them to water operations. In addition, one wing float will be securely attached to the outboard section of each wing. The main and nose landing gear will be removed enabling the propellers to have adequate clearance from water. Landing gear removal procedures will not be used for amphibious aircraft.

11 Claims, 12 Drawing Sheets

Fig 7A

| SHEAR STRENGTHS OF PROTRUDING HEAD 2017-T ALUMINUM RIVETS DOUBLE SHEAR | | | | | | | | |
|---|---|---|---|---|---|---|---|---|
| | RIVET DIAMETER | | | | | | | |
| | 1/16 | 3/32 | 1/8 | 5/32 | 3/16 | 1/4 | 5/16 | 3/8 |
| .016 | 146 | | | | | | | |
| .018 | 160 | | | | | | | |
| .020 | 168 | | | | | | | |
| .025 | 184 | 310 | | | | | | |
| .032 | 198 | 355 | 534 | | | | | |
| .036 | 206 | 372 | 574 | | | | | |
| .040 | 209 | 389 | 615 | 820 | | | | |
| .045 | 212 | 400 | 645 | 882 | | | | |
| .051 | | 417 | 675 | 944 | 1231 | | | |
| .064 | | 434 | 726 | 1053 | 1410 | 2133 | | |
| .072 | | | 756 | 1095 | 1477 | 2295 | | |
| .081 | | | 776 | 1130 | 1545 | 2455 | 3385 | |
| .091 | | | | 1161 | 1590 | 2576 | 3705 | |
| .102 | | | | 1192 | 1657 | 2697 | 3897 | 5012 |
| .128 | | | | | 1724 | 2899 | 4344 | 5742 |
| .156 | | | | | | 3060 | 4600 | 6199 |
| .188 | | | | | | 3100 | 4792 | 6564 |
| .250 | | | | | | | 4920 | 7020 |

SHEET THICKNESS*

*Sheet thickness is that of middle sheet.

Fig 7B

| BEARING STRENGTH OF RIVETS ON CLAD 2024-T4 ALUMINUM SHEET (HEAT-TREATED BY USER) | | | | | | | | |
|---|---|---|---|---|---|---|---|---|
| | RIVET DIAMETER | | | | | | | |
| E = 2D | 1/16 | 3/32 | 1/8 | 5/32 | 3/16 | 1/4 | 5/16 | 3/8 |
| .016 | 95 | | | | | | | |
| .018 | 107 | 153 | | | | | | |
| .020 | 119 | 170 | | | | | | |
| .025 | 149 | 212 | 284 | | | | | |
| .032 | 189 | 272 | 364 | 450 | | | | |
| .036 | 213 | 306 | 410 | 506 | 609 | | | |
| .040 | 237 | 340 | 455 | 563 | 676 | | | |
| .045 | 267 | 382 | 512 | 634 | 761 | | | |
| .051 | 303 | 434 | 580 | 718 | 862 | 1159 | | |
| .064 | 393 | 562 | 752 | 933 | 1116 | 1501 | 1894 | |
| .072 | 441 | 632 | 846 | 1043 | 1254 | 1693 | 2132 | 2544 |
| .081 | 497 | 712 | 952 | 1180 | 1418 | 1903 | 2397 | 2864 |
| .091 | 558 | 800 | 1071 | 1327 | 1592 | 2141 | 2690 | 3212 |
| .102 | 625 | 896 | 1199 | 1482 | 1748 | 2397 | 3010 | 3605 |
| .128 | 785 | 1125 | 1501 | 1857 | 2205 | 3010 | 3779 | 4520 |
| .156 | 961 | 1373 | 1839 | 2269 | 2727 | 3699 | 4612 | 5517 |
| .188 | 1144 | 1647 | 2205 | 2727 | 3276 | 4410 | 5545 | 6625 |
| .250 | 1528 | 2137 | 2937 | 3633 | 4365 | 5874 | 7384 | |

SHEET THICKNESS*

E = Edge Distance
D = Hole Diameter

*Values for clad 2024-T3 aluminum sheet will be equal to or greater than those listed in this chart.

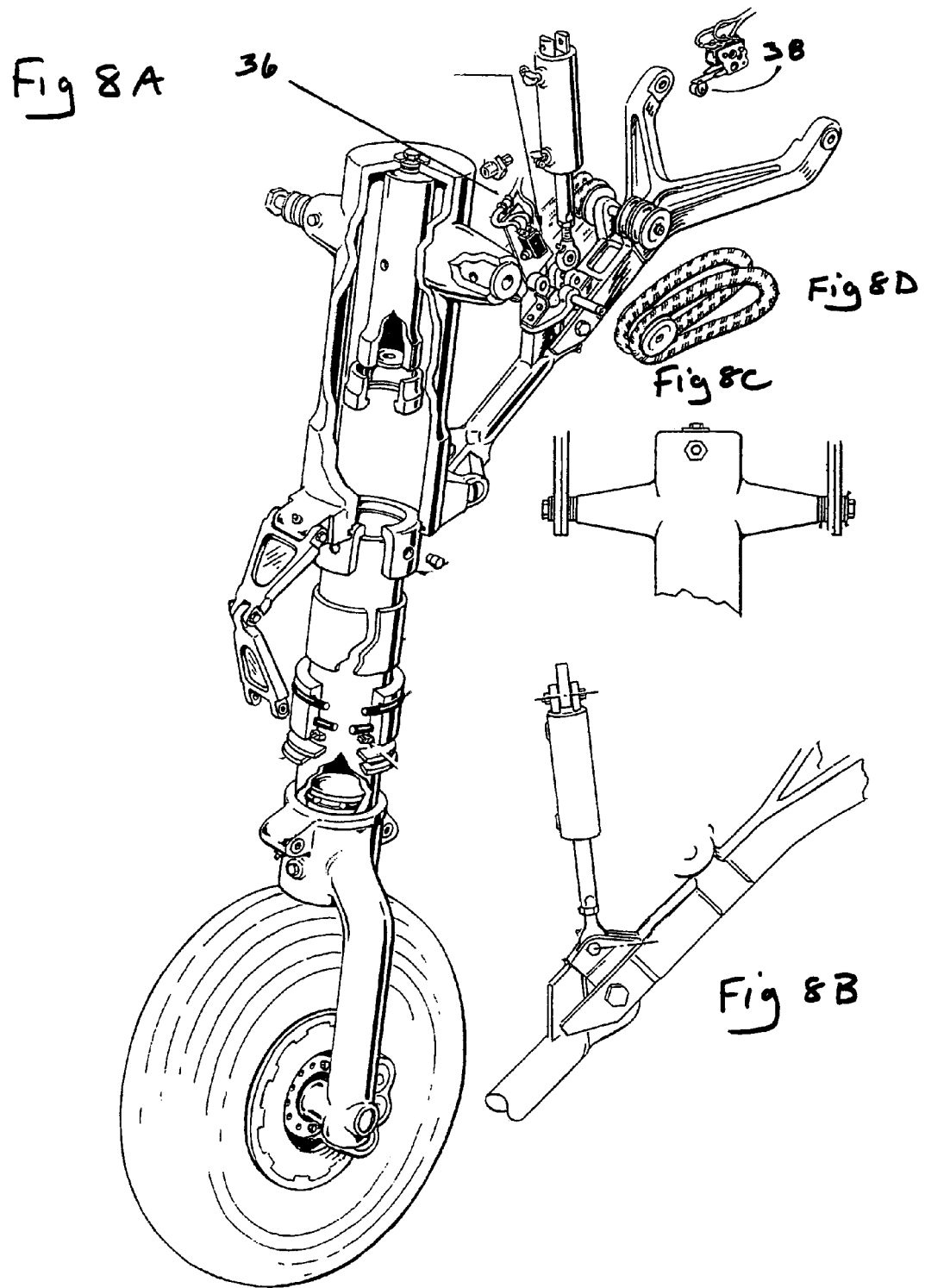

36

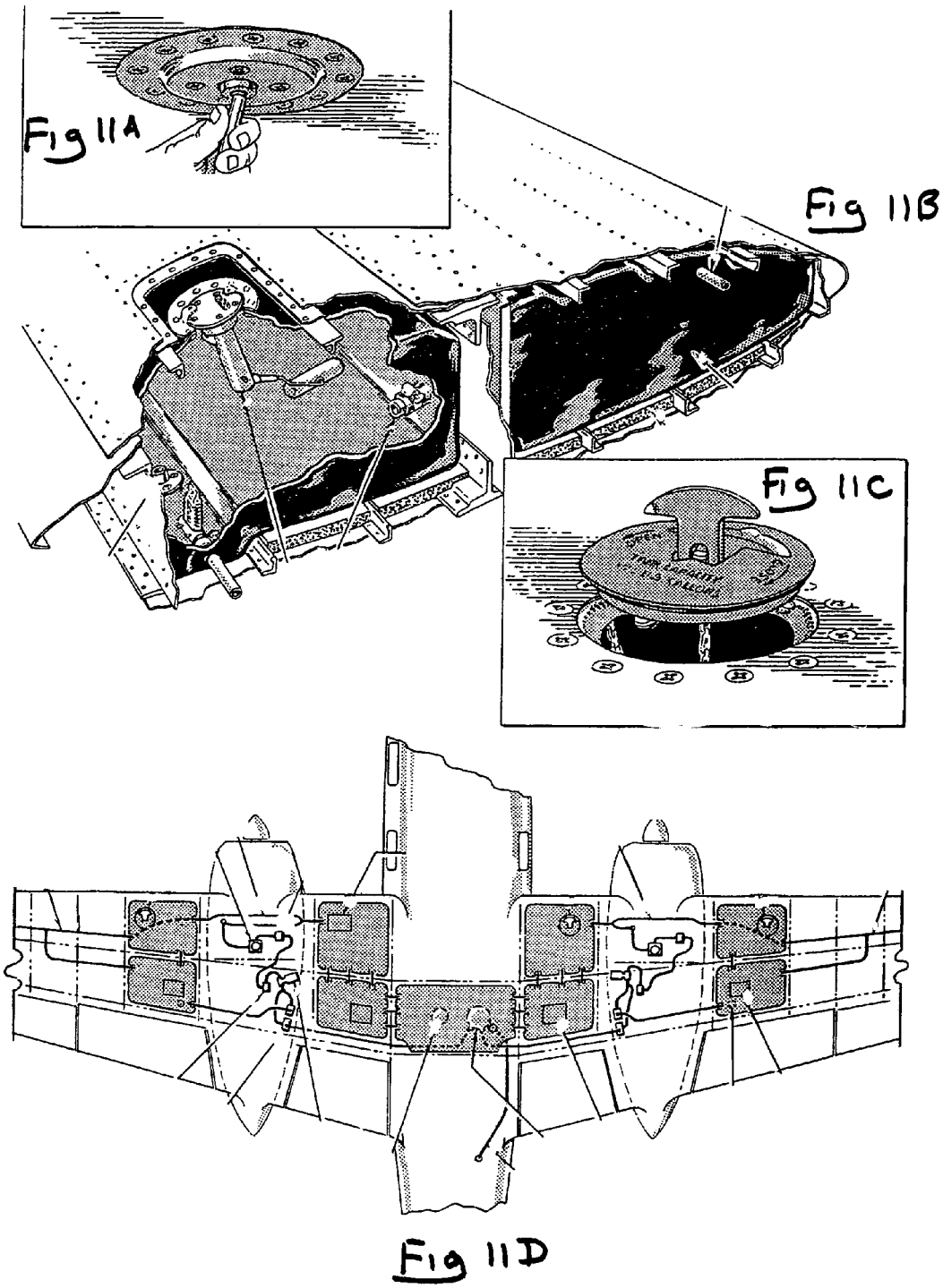

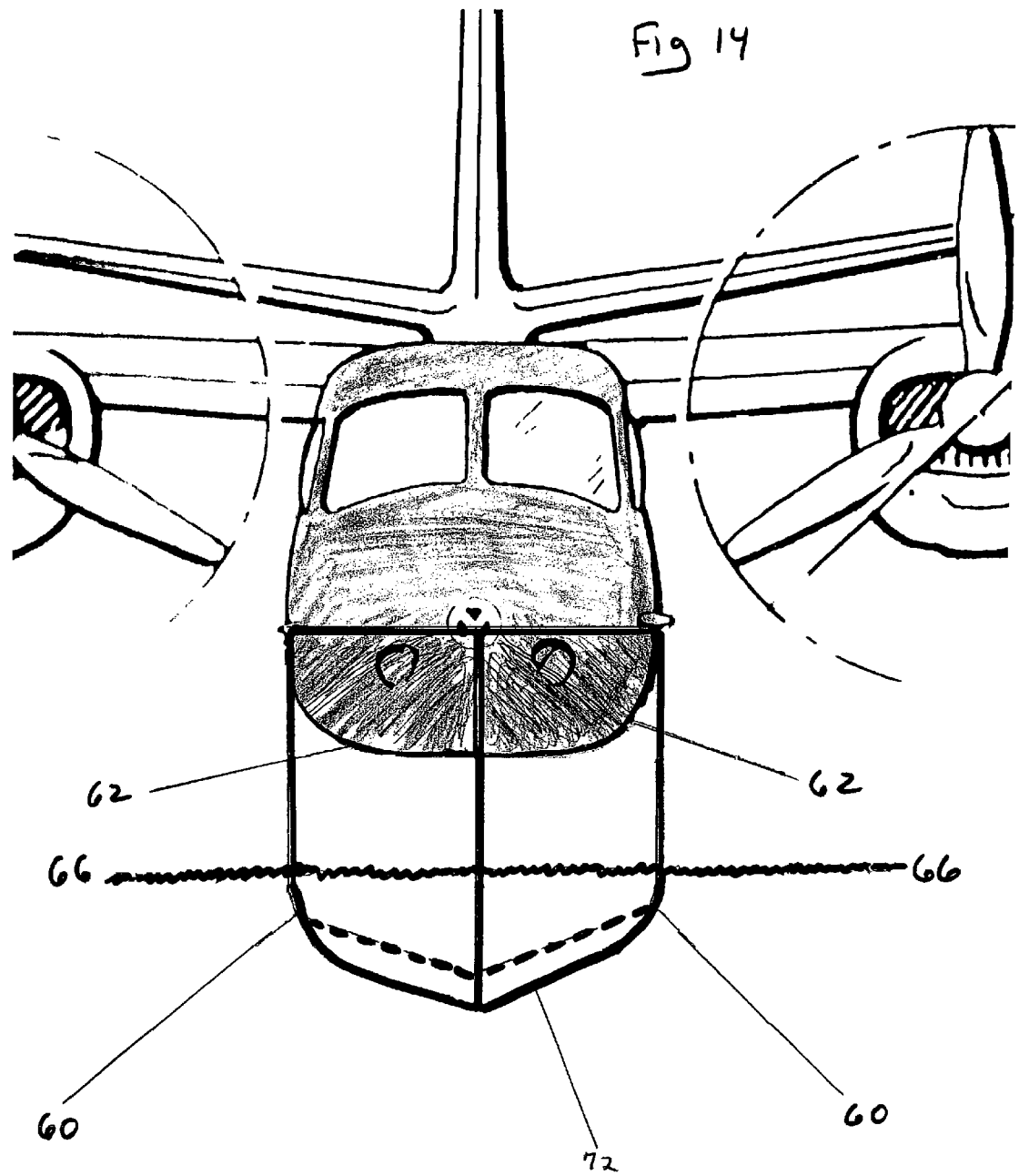

LANDPLANE TO FLYING BOAT CONVERSION

CROSS-REFERENCE TO RELATED APPLICATION

This application claims the benefit of PPA Ser. No. 60/540,974, filed 2004 Feb. 2 by the present inventor

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to flying boats, specifically to the improved design of a boat hull and wing floats affixed to a land-based aircraft.

BACKGROUND OF THE INVENTION

In 1898 inventor Wilhelm Kress made the first powered seaplane take-off from the waters of Lake Tullnerbach in Austria. Although the machine later sank, it became clear that seaplane pilots (pilote d'hydravion) had a five year headstart over their land based counterparts.

In 1937, Consolidated Aircraft added a boat hull and wing floats to a B-24 for flight test. The resultant PB-2Y was so unstable on take-off that the entire vertical and horizontal stabilizers had to be redesigned. Although many structural designs of flying boats over 200,000 pounds gross weight were used to construct the wide body jets of the 1970's there were very few aircraft flying off the water beyond 1960.

In May of 2004 the fleet of firefighting air tankers was grounded by the FAA. This void of forest fire protection has been partially filled by Canadair flying boats but clearly more "scoopers" are needed. A conversion for land planes is needed to grow this industry; for campers and hunters, for the summer fire season, for express downtown freight delivery, air-sea rescue, humanitarian aid, military applications, and traffic volume at big city airports.

While there are very few examples of prior art of this invention, a study of similiar hulls and concepts can yield a great understanding of the concepts put forth. Using the ICO database for similiar descriptions we find U.S. Pat. No. 6,705,905 Tanaka (2004) which discloses a rotory winged aircraft capable of navigating on land, sea, and air. The fuselage and cylindrical ducts were connected to movable struts which encased the rotors. High fuel consumption and maintenance costs of this machine make it economically unsuitable for commercial or private operations.

Several examples of amphibious hulls, U.S. Pat. No. 6,290,174 (2001), U.S. Pat. No. 6,592,073, (2003), and U.S. Pat. No. 6,653,189 (1997) show a propensity for water operations but do not contemplate use of an attached hull to convert land planes.

U.S. Pat. No. 3,945,589 to Crompton (1976) is an interesting adaptation of the Von Hindenburg concept, i.e. of the carriage of separate vehicles in an airship for the purpose of taking on and discharging water. This water transfer role has been practiced for years by scooper fire fighters such as the Canadair CL-415 and is one of the major outgrowths of the conversion modules.

U.S. patent application No. 2002/0011199 to Barsumian apparently has not yet been issued. It is a devise for ferries, amphibious landing craft, and military patrols which uses boundary layer control as an air cushion. This hover craft isolates part of the hull from coming in contact with the water thus reducing drag. Although it would be impossible to use such a concept with my present application in a boat hull modification, more advanced hulls constructed in the future may envelope this design.

Since the early 1920's, passengers have designed emergency landing systems for air carriers. While the solution is obviously more proficient pilots, we now deal with U.S. Pat. No. 4,799,630 to Richards (1989). Landing attachments to the underbelly are encased in a fairing would presumably be used in a crash. The numerous problems with this system are that the canoe shaped modules would rip off during the landing and impale many of the passengers.

Finally we discuss U.S. Pat. No. 6,113,028 to Lohse (2000) and U.S. Pat. No. 6,367,737 also to Lohse (2002). The inventor apparently had problems accomplishing his amphibious goals using his first design and thus made some minor improvements on it two years later. His use of a single engine would not be adaptable on a boat hull nor would it be fuel efficient for long distance delivery systems. The engine position has introduced a worthwhile aerodynamic concept.

BACKGROUND OF INVENTION—OBJECTS AND ADVANTAGES

Accordingly, besides the objects and advantages of a boat hull added to the fuselage of a land based aircraft described in my above patent, several objects and advantages of the present invention are:

(a) to provide efficient cruise specifications and improving on float plane performance (b) to enable the aircraft to lift off the water by 80 knots (c) to reduce air traffic congestion at high volume airports (d) to produce better air quality in downtown areas (e) to reduce owner's tiedown and landing fee costs (f) to enable campers, fisherman, hunters and wildlife ehthusiasts to visit pristine areas (g) to provide a well-secured and safely attached hull for all phases of flight (h) to return the aircraft to a land base at the owner's option (i) to produce a hull that will not appreciably affect the aircraft gross weight (j) to produce a hull that will provide stability on take-off and landing (k) to produce a hull comprised of fiberglass materials which will not collect barnacles at mooring (l) to provide wing floats aerodynamically efficient which will give pilots 10 knot cross wind take off capability (m) to provide an economical conversion package for transport and private aircraft owners (n) to enable convenient and safe docking and aircraft mooring Further objects and advantages are to provide a structurally sound design for larger high wing cargo aircraft. C-130 type civilian and military versions are designed for short fields to deliver rescue and military aid rapidly. Still further objects and advantages will become apparent from a consideration of the ensuing description and drawings.

SUMMARY

In accordance with the present invention a flying boat conversion module consists of an attached hull comprising of two concave sections on either side of a slender bow, a reinforced keel running amidships from stem to stern, upward slanting (25 degrees) sections of hull both sides of the keel, a five inch step pointing aft from the vertical at a 20 degree angle, two concave sections aft of the step, and two wing floats suspended from both spars at a 20 degree angle with the horizontal.

DRAWINGS—FIGURES

In the listed drawings, those without reference numbers are referred to in toto.

FIGS. 7A and 7B show shear strength and bearing strength of appropriate rivets

FIG. 8 illustrates removal procedures for main landing gears

Figures 9A, 9B, 9C:
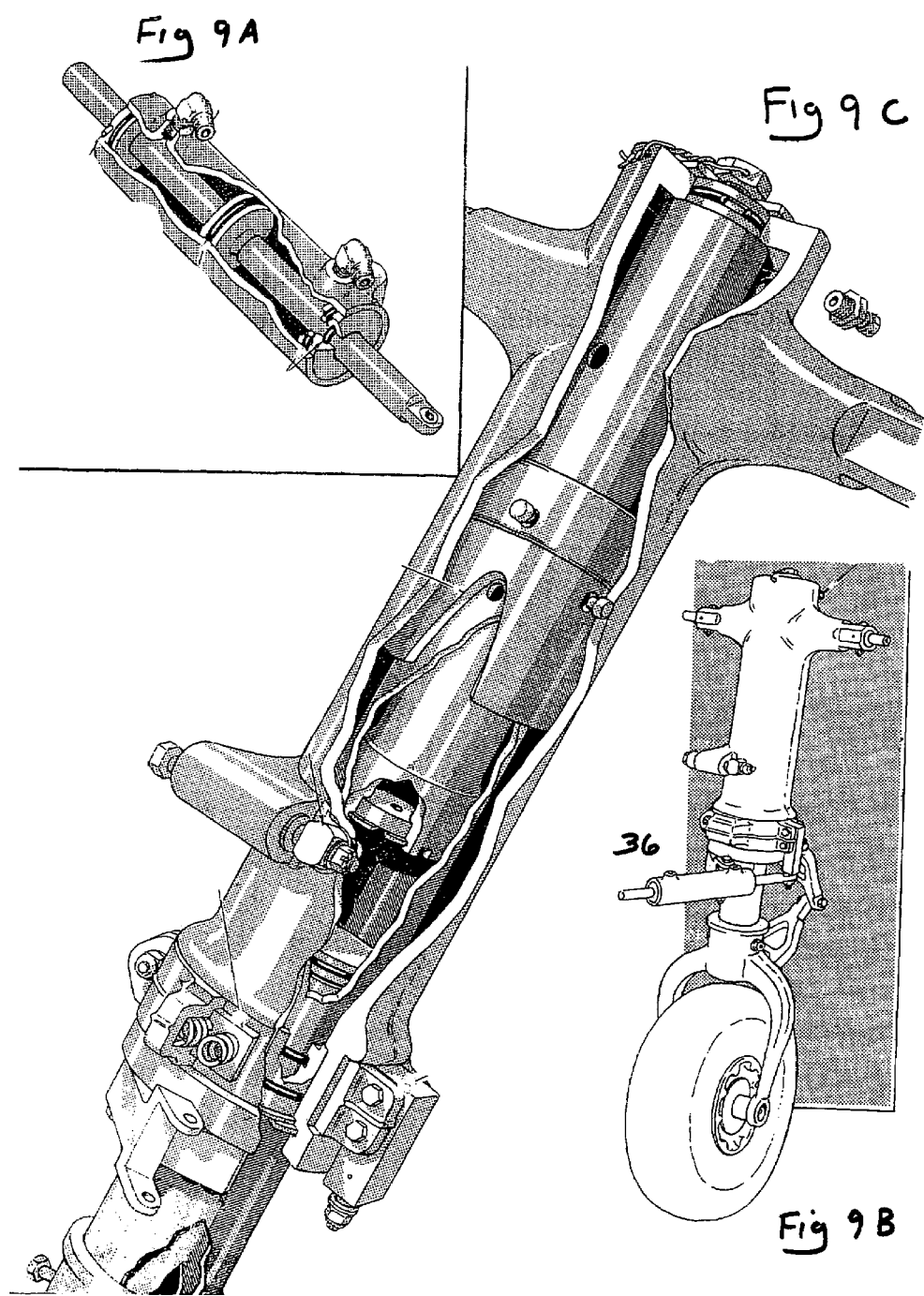
Figure 10A:
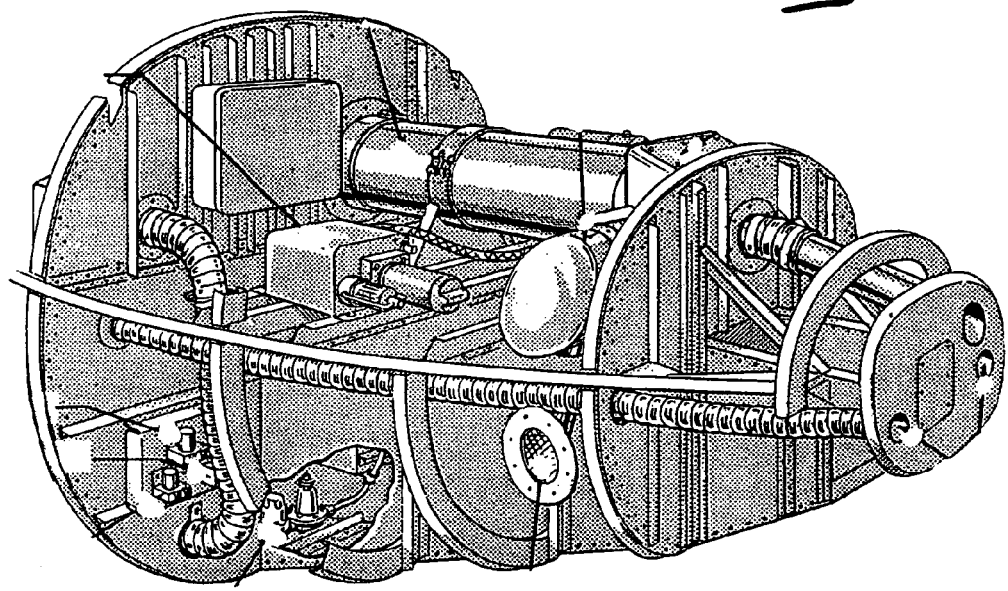
Figure 10B:
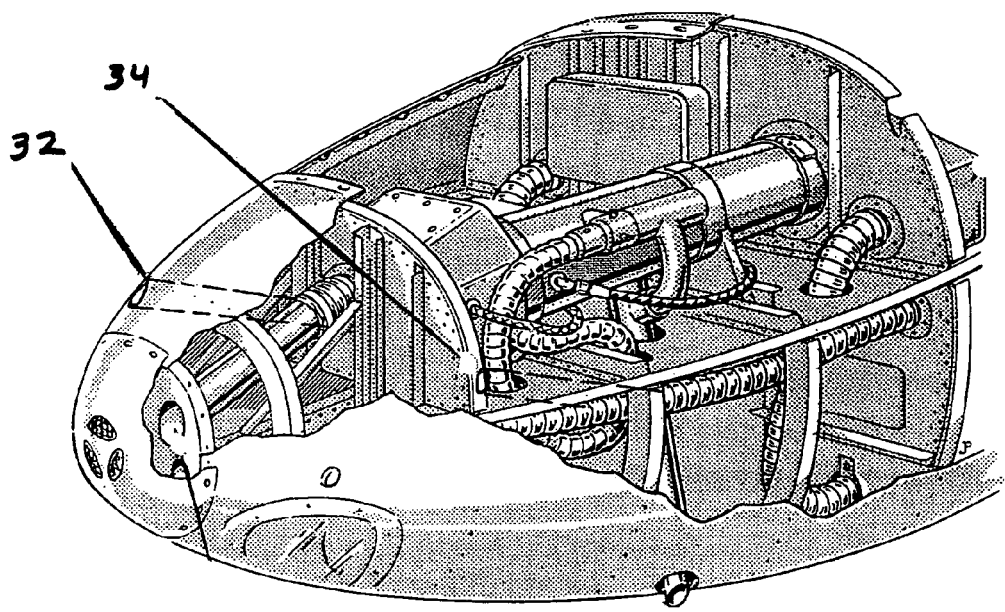
Figure 12A:
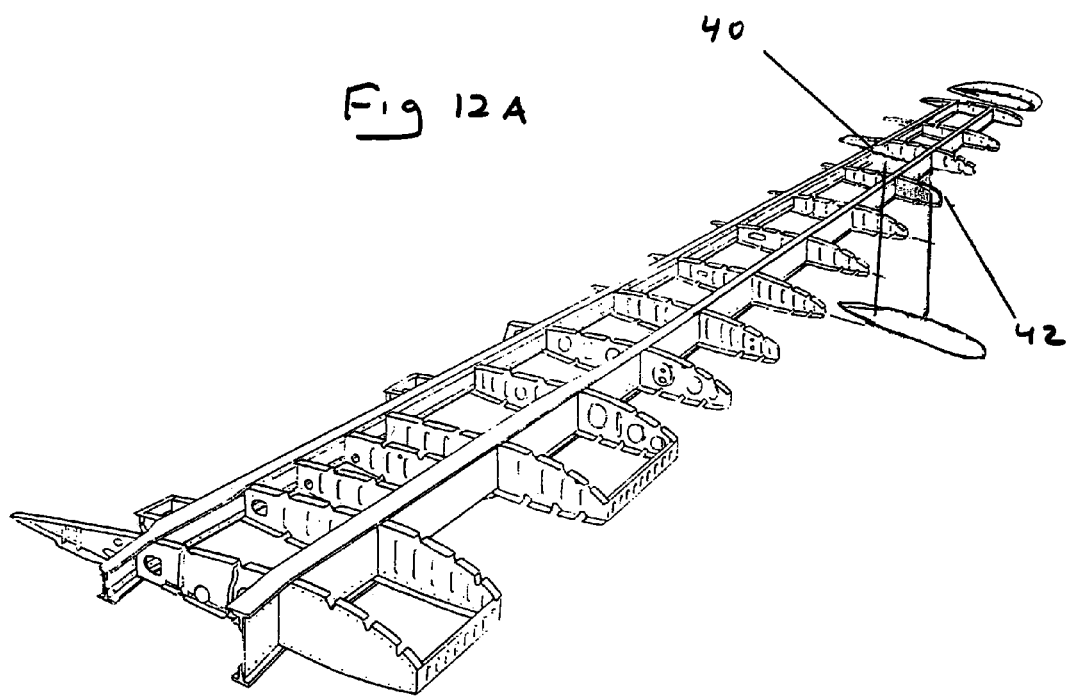
Figure 12B:
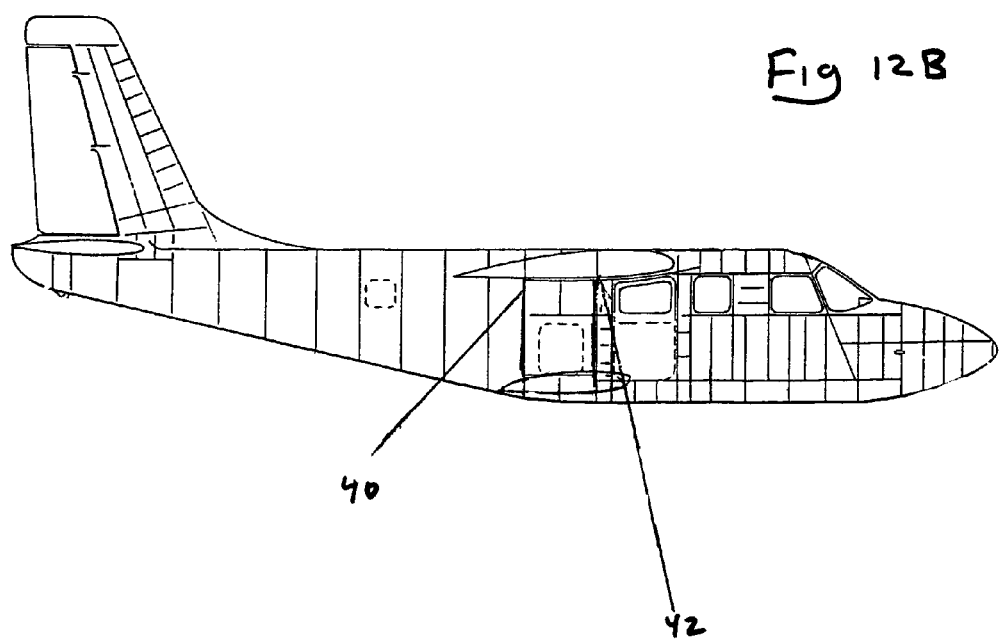
Figure 13:
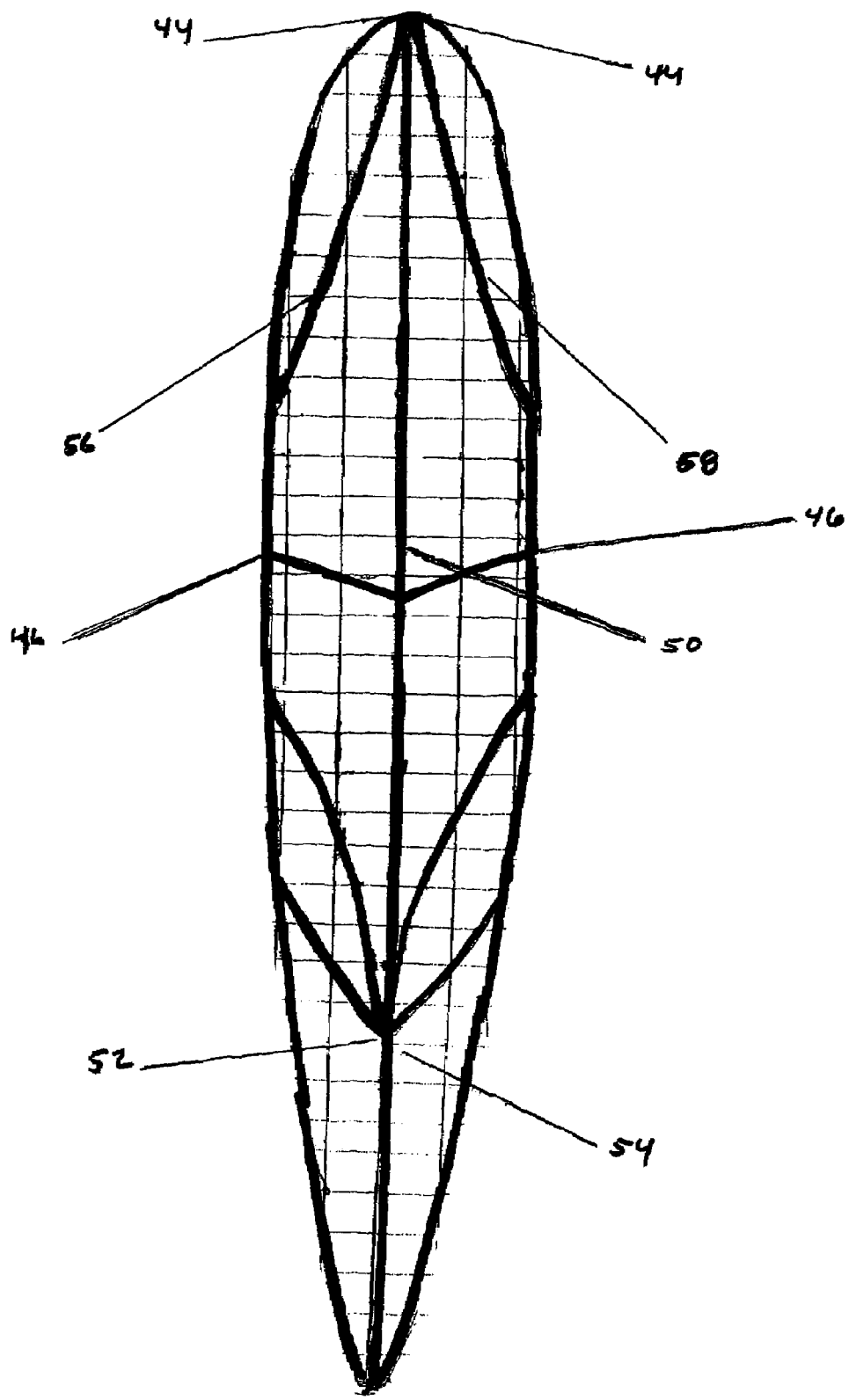

FIG. 9 illustrates removal procedures for nose gear and nose wheel steering with an insert showing the bleed air source FIG. 10A and 10B show heater intake and exhaust duct modification above the waterline FIGS. 11A to 11D show fuel tank location relative to the wing float brackets FIGS. 12A and 12B show installation of wing floats relative angle to water FIG. 13 bottom view of the hull and associated step outlined by fuselage FIG. 14 shows a frontal view of the hull depth, fresh water, at maximum gross weight—propeller clearance to the water is also shown

DRAWINGS—REFERENCE NUMERALS 16 pilot view relative to engine position
18 tail height above spray
20 propeller clearance
22 propeller clearance
24 main door exit
26 pilot's window exit
28 starboard window exit
30 jackstand height
32 new ram air intake port
34 new fresh air port
36 gear warning horn power supply
38 gear warning horn grounding
40 rear float attachment rib
42 forward float attachment rib
44 forward lock bolt module attachment
46 step attachment to former
48 aft module attachment
50 keel-spar position
52 aft splash deflector
54 aft splash deflector
56 forward splash deflector
58 forward splash deflector
60 top step level
62 original hull
64 keel stringer
66 mean fresh water line
68 new hull former
70 top level of module
72 bottom level of step plane
74 old formers
76 new hull stringers
78 sheet metal thickness 0.025 in,
80 bow line bracket
82 step position on slow taxi

DETAILED DESCRIPTION—FIGS. 1A TO 1C—PREFERRED EMBODIMENT

Figure 1:
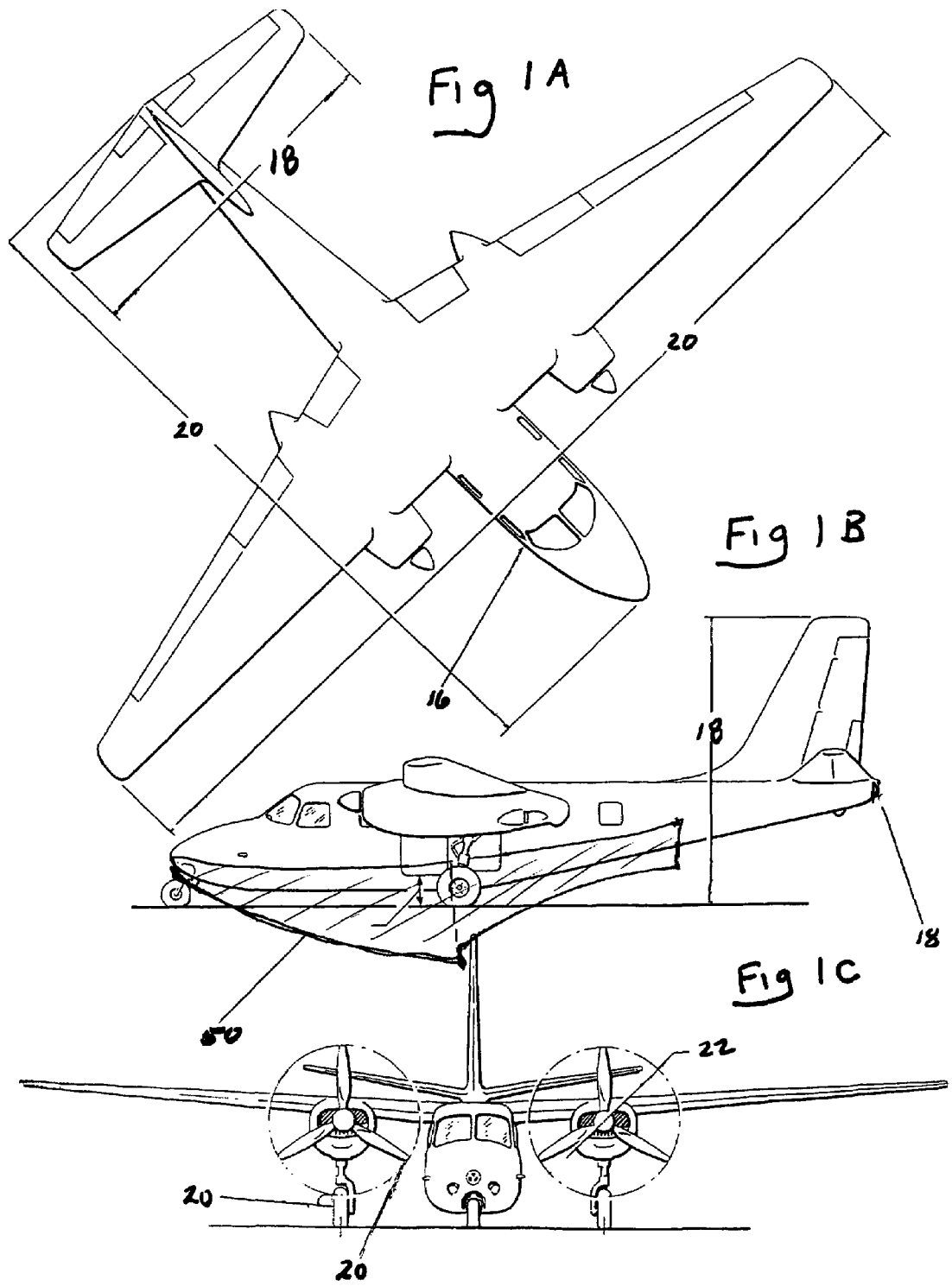
FIGS. 1A to 1C show various views of a highwing aircraft before modification
Figure 2:
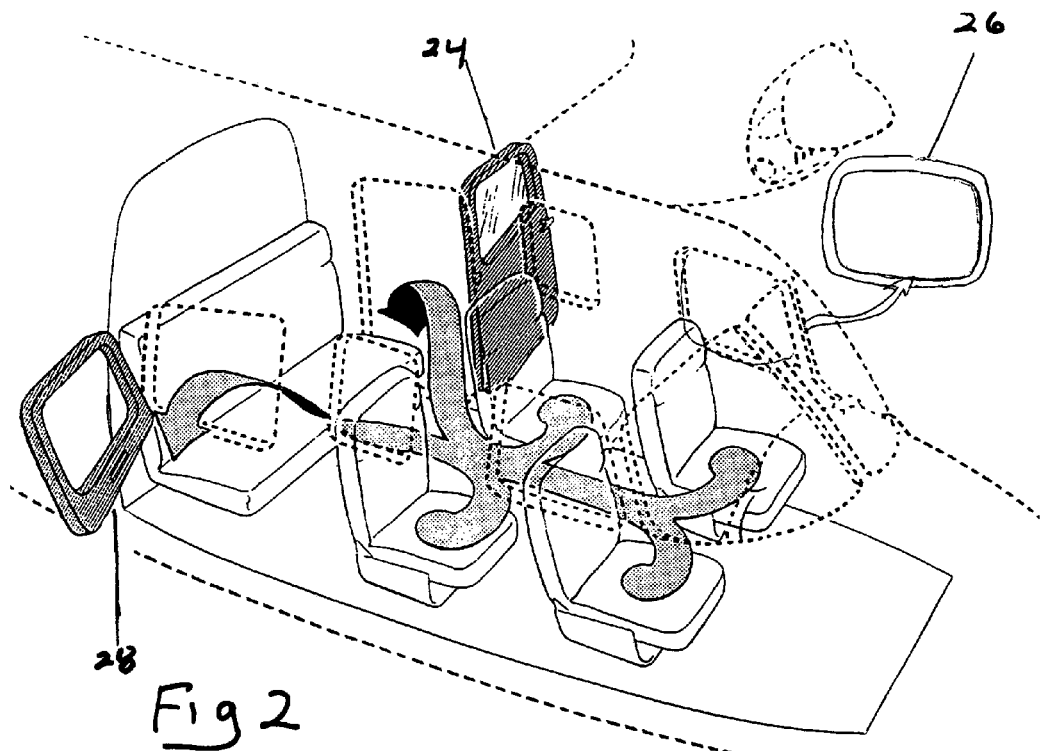
FIG. 2 shows modified cabin and cockpit emergency exits
Figure 3:
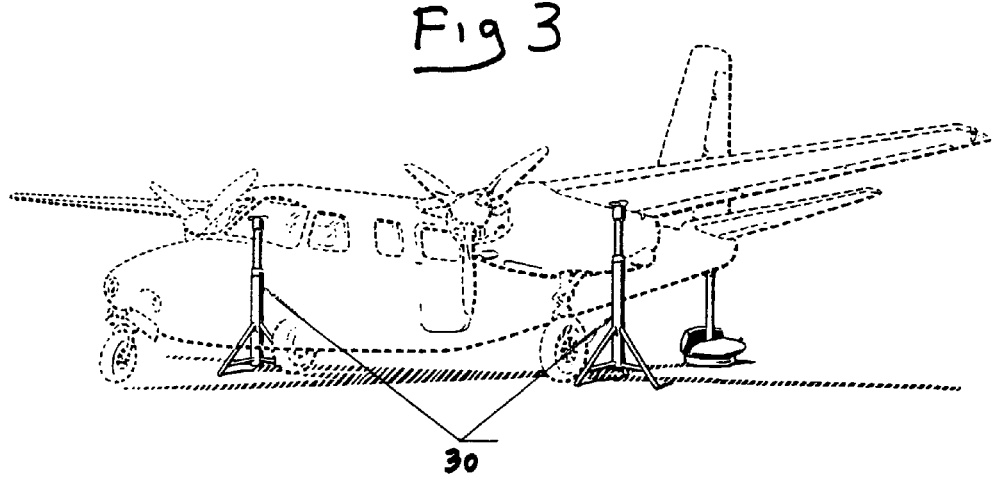
FIG. 3 shows aircraft jackstand installation procedures

A preferred embodiment of the target installation of the present invention is illustrated in FIG. 1A in the top view. The fuselage is at maximum width from the location of the landing gear forward to the pilot's position at the center of the cockpit window (FIG. 1B). Thus in hull design, the width of the fuselage reduces rapidly from the step. This result is in less aerodynamic drag aft of the step for an area which produces air "burble" at speeds over 200 knots.

In planning construction of fiberglass modules we must balance hull depth between two factors; propeller clearance from the water and required buoyancy. Since propeller manufacturers recommend 36 inches for 1 foot seas, this factor becomes limiting. Buoyancy requirements for this hull in an aero commander are less than 24 inches depth.

First step in constructing the module is a full-scale wood model followed by a thin layer of fiberglass mat from FIBERTEX of El Monte, Calif. This supplier has been used by major boat builders out of Newport and Laguna Beach locally. When properly dry, Gelcoat is applied and the model is moved to the inverted position on 30 inch sawhorses. Great care is taken to connect two halves which are joined at the step by lock bolts 50 since the angle of incidence is critical on take-off.

FIGS. 2–12 Additional Embodiments

Figure 5:
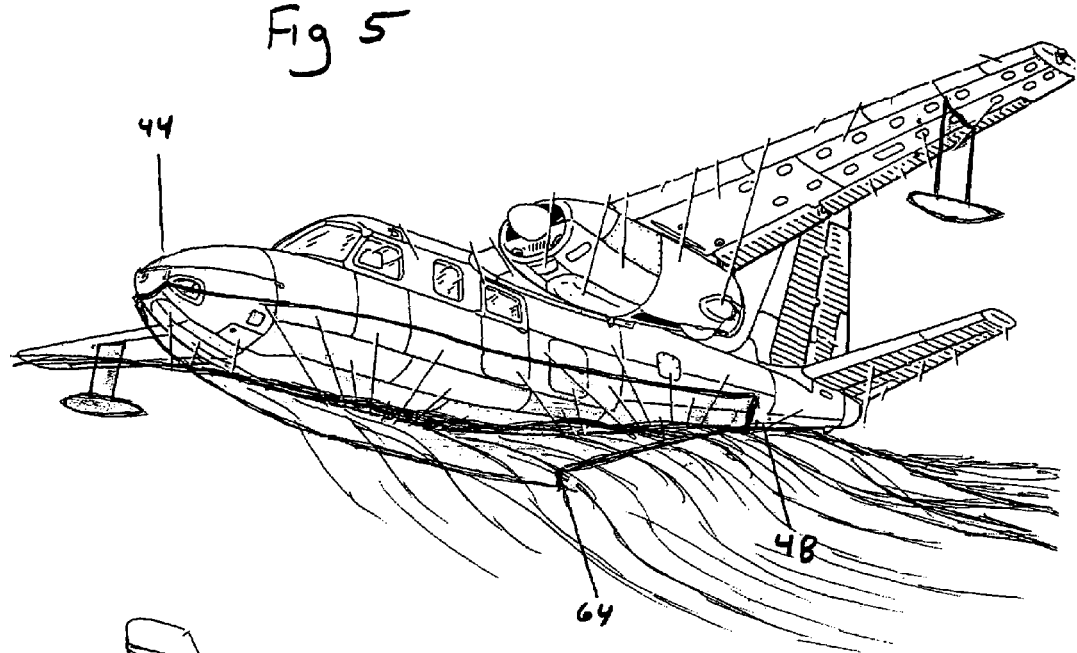
FIG. 5 shows wave action of the boat hull at lift off
Figure 6:
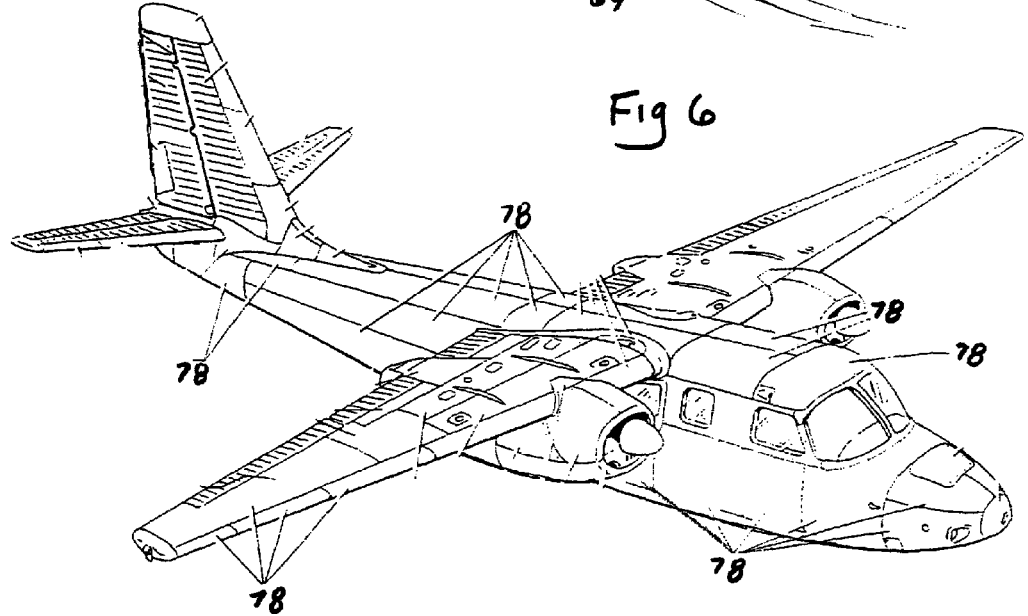
FIG. 6 shows the location of various skin thickness and rivet strength

Second phase begins with the generous coat of mold release wax to the surface of the plywood-fiberglass model. The key to understanding this process is to realize in building the "plug" we work from the inside out and in building the "product" we work from the outside in (FIG. 5). Great care is given smoothing the first fiberglass coat with a putty spreader. The "plug" will be ½ inch thick on the sides and will dry in 48 hours with 7 coats. 50 It is then carefully removed from the model and its inside surface will produce the product.

We are now ready for the third step, producing the product. Making certain the inside surface of the "plug" is thoroughly sanded we apply an ample coat of mold release wax followed by our first 3 coats of resin-fiberglass mat. When dry, we install the hull formers (FIG. 4) 68. These ½ inch plywood, 48 parts are set 15 inches on center and match the existing hull formers 74.

Figure 4:
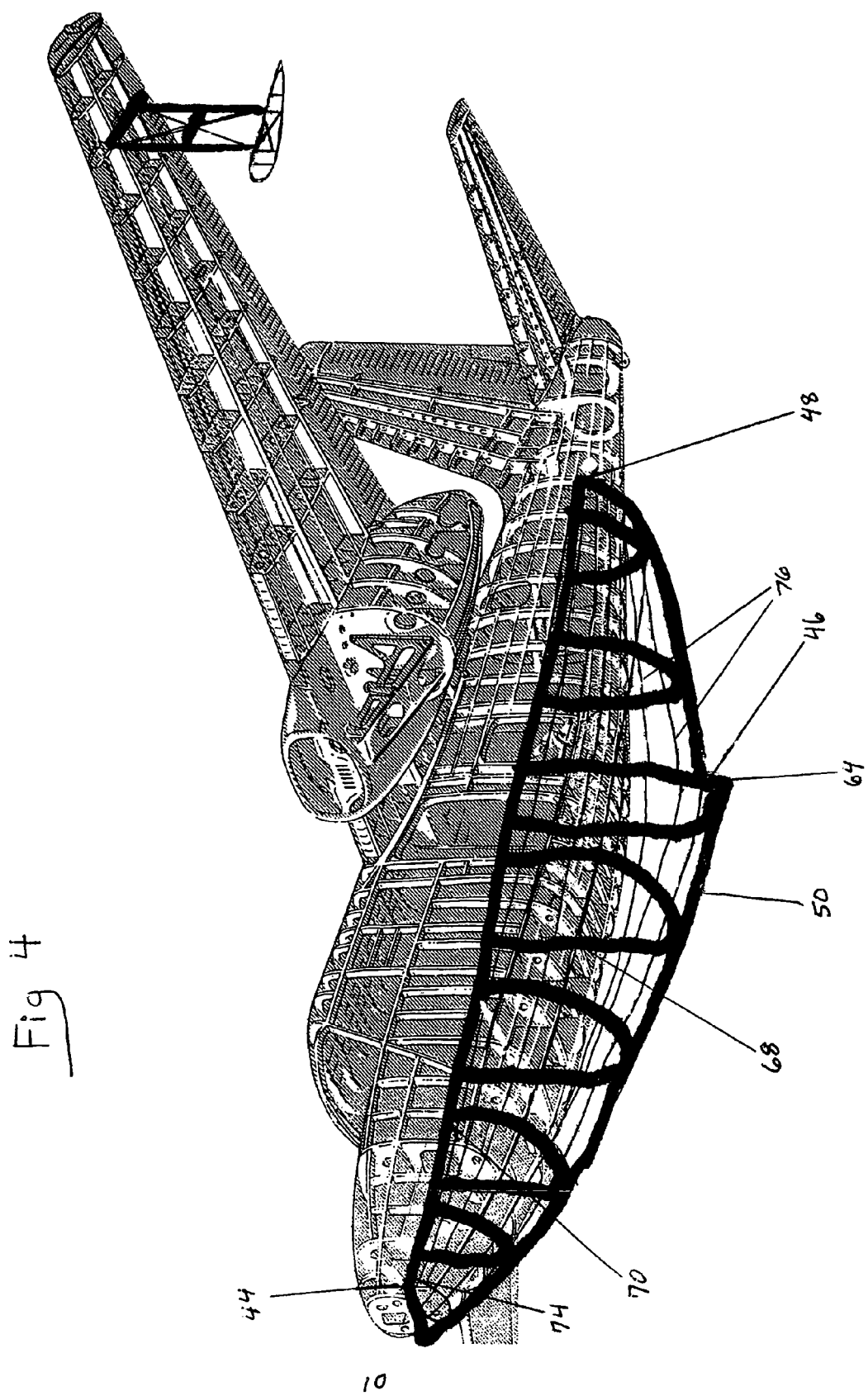
FIG. 4 shows boat hull structural members, stringers and formers

Next the keel stringer 64 is layed consisting of 2×2 fir. The 8 new hull stringers 76 then parallel the keel 74 (FIG. 4). We are now ready for product-plug separation. Being very deliberate, we gradually separate the two pieces and mount our module for final gelcoat and sanding. This product has a weight of 250 pounds. Since both floats weigh 100 pounds and the removed landing gear weigh 350 pounds our weight loss/gain is negligible.

We use the standard aircraft jackstand (FIG. 3) to attach the hull. ¼ inch holes are drilled toward the outside of each former passing 2 inches below the top of the new hull until we have 66 attachment bolts 74, 76. The module is then filled with gel-foam, dried and mounted. This foam filler will add to the longitudinal strength during landings and will weigh 50 pounds. It will match the form of the existing fuselage.

(FIG. 5 and FIG. 12A) The installation of wing floats will be at wing station 257. The standard torpedo shape 40, 42 is designed to touch fresh water at at maximum gross weight with an angle of incidence of 20 degrees above horizontal. (FIG. 12B) Referring to tables (FIGS. 7A & B) we see that rivet strength is 212 pounds via a 3/32 inch diameter. This is well within the allowed stress and forward force upon an open sea landing (FIG. 5). The installation will be well outboard of fuel lines listed (FIG. 11A–D).

Our heater and outside air ducts (FIGS. 10A & B) are removed and placed above the top of the module 32, 34. The exhaust port is fitted with a venturi plug.

Finally the aircraft is prepared for landing gear removal (FIG. 9A–C and FIG. 8A–B). Some aircraft owners may choose to retain landing gear in which case the aircraft would become amphibious. After the bungee (FIG. 8D) is removed, nose gear steering, lock pinions and associated air lines are removed following standard North American Aircraft procedures. The same method are used for the main gear and the removed parts are carefully stored for reuse.

FIGS. 13–14 Alternative Embodiments

There are various possibilities for other uses for this hull shown by its position in the water 66 and the "V" shaped step (FIG. 13) 46. It is evident from the upward slant of the tail section 46, 54 that resultant spray pattern will produce a successful take-off at 80 knots. Stable water taxi will also result from the section 46 50.

Operation—FIGS. 4, 5, 13, 14

With an experimental certificate (FAA form 8130-6) the module can be tested through all phases of flight. The process involves buoyancy, weight-balance, slow and fast taxi, take-offs and landings, docking procedures and cruise configuration. Stall characteristics will not be affected due to wing floats since flaps and wing will remain substantially the same. At the end of 4–6 months the Supplemental Type Certificate (FAA form 8110-12) should be applied for.

While we see safe and intact structural integrity it must be noted that testing a new hull can sometimes produce unexpected results. Thus allowances should be made in the time to complete testing. It is clear that this invention will be suitable for many types of airfreight, turbo-props, and aft mounted jet engines Take-off technique (FIG. 14) will be full aft controls upon the gradual application of power. Feeding in full right rudder with neutral aileron will steady the floats in a straight line take-off. Upon reaching 80 knots relaxing back pressure on the yoke will enable a smooth lift off from the water 66.

Advantages

From the description above, a number of advantages of my flying boat conversion become evident;

(a) Boat hulls have always produced less drag than float planes. The fact that they haven't been produced in quantity for 50 years should strengthen the demand of potential owners. The sleek hull displayed (FIG. 5) will save fuel and engine time.

(b) 80 knot lift offs are common for the aero commander type with ¼ flaps. Hull design (FIG. 1B) will enable the aircraft to break free of the surface.

(c) Downtown sea/air ports are being reevaluated by many cities. They relieve congestion at peak travel periods and promote convenient deliveries.

(d) Air quality has definitely deteriorated in urban areas during the past 5 years. Fuel treatment programs, alternate routes, car pooling and staggard truck deliveries have failed to improve the situation. The fuel saved from direct approaches, no holding time, less runway delay will definitely contribute to cleaner air.

(e) Owner tiedown and landing fees have risen to $100/month tiedown and $200/landing in many areas. These expenses will be completely eliminated during water operations and will give owners the opportunity to save for their aircraft upkeep.

(f) Vacationers following behind 35 mph campers sometimes wonder if the trip was worth it. From Maine to Florida, San Diego to Seattle and in between family vacations are much more enjoyable on a lake or a river. Flying boats have become the flying yacht or the new century.

(g) As noted in detailed description (FIG. 4) the conversion hull and wing floats will be safely secured to the form of the existing hull and wing respectively and fortified with a foam insert. Each installation will be thoroughly tested to FAA specifications.

(h) By replacing lock nut bolts with a rubber gasket, the flying boat can easily be returned to land operation. Landing gear should be drop checked according to maintenance handbook instructions (i) Weight and balance calculations will be completed during flight testing. Removing landing gear, installing the module and wing floats will produce no change in aircraft gross weight and/or payload.

(j) Hull stability on take-off and landing is critical for flying boats. (FIGS. 4 and 5) Based on historical data and previous models, the hull of this invention will easily operate in the displacement, planning, and aerodynamic phases of flight.

(k) Barnacles and mussels adhere to any metal or wood hull whether painted or unpainted. Some zinc based paints have reduced the amount of adherence but the problem exists in all oceans regardless of the mean temperature. Because of the smooth surface of gelcoat, marine adherence has been eliminated. Thus fiberglass is a much improved hull in this area.

(l) A conversion package for the Aerocommander will cost owners from $15,000 to $20,000 depending on the extent of flight test. This compares favorably with a $30,000 to $40,000 cost of installing two floats. Larger aircraft such as C-130, C-123 would be considerably higher. Fuel savings for these high wing transports would be very cost efficient (m) Shutting down engines as the buoy is approached will enable the pilot to snare it with a boat hook in mooring position. Docking proceedures also recommend shutting down since prop to water clearance is close. (FIG. 14) This maneuver should not be a problem after a few practice approaches.

CONCLUSION, RAMIFICATION, AND SCOPE

Accordingly, the reader will see that the fiberglass conversion module can be easily installed and conveniently used. Fiberglass construction will produce a strong hull that will operate safely in all phases of flight. FAA certification of these materials has been very successful. This invention permits production in a variety of areas and in small facilities.

the installation is reversable and the module can be removed at the owner's option the module can be gelcoated in any color according to the aircraft paint scheme the module provides additional strength to the existing hull the module is aerodynamically sleek having a low drag coefficient and improved fuel specifications over float planes the module operates at flight parameters which are in conformance with the aircraft pilot's handbook this module has a longevity of at least 20 years in the water comparatively the same as its water craft equivalent. This is at least 50% more than an an aluminum hull.

Although the description above contains many specificities, these should not be construed as limiting the scope of the invention but as merely providing illustrations of some of the presently preferred embodiments of this invention. For example the invention can be used on virtually all types of powered aircraft and even gliders. In addition, military application of this invention can be used to deliver troops and supplies to remote river lakes. The step position directly beneath the center of lift of the wing can be changed to fit the gross weight and take-off speed. Thus the scope of the invention should be determined by the appended claims and their legal equivalents, rather than by the examples given.

I claim:

1. A method to convert a land plane to be amphibious, the method comprising:
   forming a new hull made out of fiberglass using a mold, the new hull reinforced with stringers and formers covered with additional fiberglass;
   attaching the new hull to an old hull on the land plane, the new hull attached to the old hull using new hull formers which are attached to existing hull formers on the old hull using lock tight bolts; and
   attaching floats on each wing of the land plane.

2. The method of claim 1, wherein a step is attached to the hull, the step pointing aft from a vertical at a 20 degree angle.

3. The method of claim 1 wherein a pointed aft section is attached to the hull.

4. The method of claim 1 wherein said new hull is filled to capacity with polyester foam for added structural strength.

5. The method of claim 1 wherein said new hull is reinforced with stringers and formers covered with additional fiberglass.

6. The method of claim 1, wherein there are two stabilizing torpedo shaped wing floats securely attached to each wing.

7. The method of claim 6, wherein said floats are made of fiberglass.

8. The method of claim 6 wherein said float apparatus is operated at an angle of 20 degrees with a horizontal.

9. The method of claim 6 wherein said floats are sufficiently heavy to stabilize water taxi and crosswind operations.

10. The method of claim 6 wherein said floats are outboard of all fuel lines and fuel cells.

11. The method of claim 6, wherein the floats are fortified with a foam insert.

* * * * *